(12) United States Patent
Pinkley

(10) Patent No.: US 6,813,855 B2
(45) Date of Patent: Nov. 9, 2004

(54) GUN SIGHT RETICLE ALIGNMENT

(76) Inventor: Phillip Dale Pinkley, 17971 Township Rd. 265, Kenton, OH (US) 43326

( * ) Notice: Subject to any disclaimer, the term of this patent is extended or adjusted under 35 U.S.C. 154(b) by 0 days.

(21) Appl. No.: 10/382,160

(22) Filed: Mar. 5, 2003

(65) Prior Publication Data

US 2003/0177685 A1 Sep. 25, 2003

Related U.S. Application Data

(60) Provisional application No. 60/365,458, filed on Mar. 19, 2002, now abandoned.

(51) Int. Cl.[7] .................................................. F41G 1/44
(52) U.S. Cl. ............................ 42/120; 42/122; 42/125; 33/286; 33/295
(58) Field of Search ......................... 42/120, 122, 125, 42/126, 135; 33/286, 295

(56) References Cited

U.S. PATENT DOCUMENTS

| | | | | |
|---|---|---|---|---|
| 2,788,578 A | * | 4/1957 | Digiacinto | .................... 33/295 |
| 3,112,567 A | * | 12/1963 | Flanagan | ...................... 42/121 |
| 3,908,282 A | * | 9/1975 | Steffan | ......................... 42/121 |
| 4,095,347 A | * | 6/1978 | Steffan | ........................ 42/121 |
| 5,442,860 A | * | 8/1995 | Palmer | ......................... 42/120 |
| 5,878,504 A | * | 3/1999 | Harms | ......................... 42/120 |

FOREIGN PATENT DOCUMENTS

DE        36 23 455 A1   *   1/1988

\* cited by examiner

*Primary Examiner*—Stephen M. Johnson
(74) *Attorney, Agent, or Firm*—Thomas S. Baker, Jr.

(57) ABSTRACT

Apparatus for correcting the rotation of canted reticle cross hairs in the sighting scope of a firearm is disclosed and is comprised of a vertical reference sub-assembly and a separate firearm level sub-assembly which are utilized together to properly position and orient the firearm prior to rotation of the firearm sighting scope sufficiently to eliminate the included cant of the reticle system cross hairs.

3 Claims, 2 Drawing Sheets

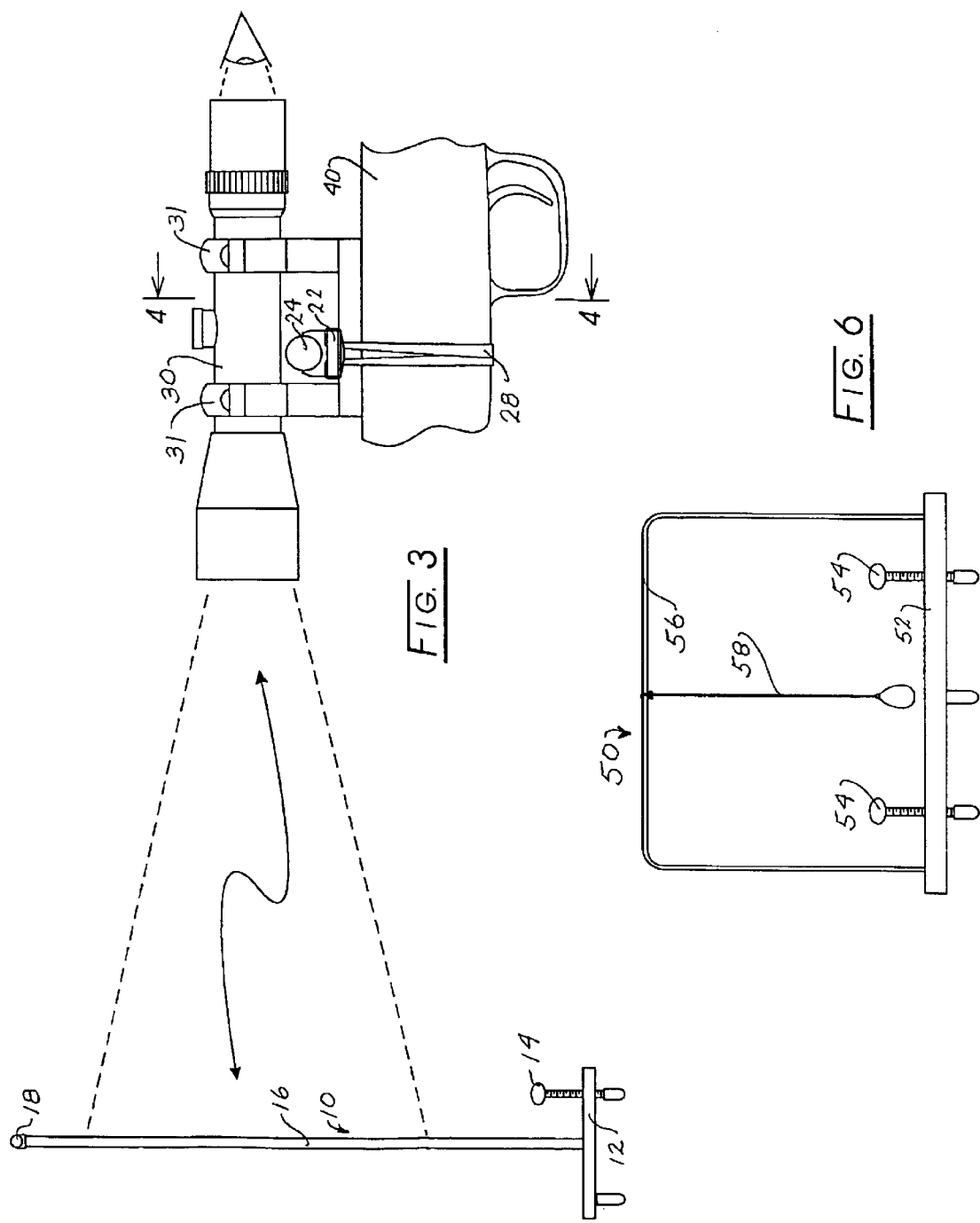

GUN SIGHT RETICLE ALIGNMENT

PRIORITY

This application claims the priority of provisional U.S. patent application No. 60/365,458, filed Mar. 19, 2002 now abandoned, by Phillip Pinkley, for Precision Three Axis Scope Leveler.

CROSS-REFERENCES

None.

FIELD OF THE INVENTION

This invention relates generally to hand-held firearms, and particularly concerns both apparatus and methods for precisely aligning the vertical cross hair of the reticle system of an attached sighting scope to be parallel to a symmetry axis of the firearm that is vertical and perpendicular to the firearm bore.

BACKGROUND OF THE INVENTION

Sighting scopes, both those that magnify the sight field and those which have reticles but do not magnify the sight field, are typically mounted on their respective rifle, pistol, or shotgun by means of co-operating mounting rings attached to the receiver of the firearm. The scopes contain reticles which are a system of lines, dots, cross hairs, wires, or electrically projected images which aid in the sighting of a target and proper positioning the weapon relative to a target. A common reticle system is comprised of a horizontal cross hair intersected by a vertical cross hair.

It has been found that most times when a scope is mounted in the scope mounting rings attached to the receiver area of the firearm the scope is canted or rotated to some degree such that the vertical cross hair of the reticle system is not positioned parallel to the vertical axis of the firearm and does not necessarily intersect the longitudinal axis of the firearm bore. Shooters, especially competition target shooters, tend to compensate for the included cross hair canting by counter-rotating the firearm and thus compromise the accuracy of this shot.

It has been discovered that by aligning the vertical cross hair of the reticle system with the vertical axis of the firearm the accuracy of the firearm is noticeably improved.

SUMMARY OF THE INVENTION

The present invention is essentially comprised of a vertical reference shaft sub-assembly and a co-operating firearm level sub-assembly that is removably attached to the receiver area of the firearm. The vertical reference shaft sub-assembly is further comprised of a weighted base member, a mounted vertical reference shaft, and a bubble level mounted at the top of the vertical reference shaft and oriented perpendicular to the axis of the shaft. Such sub-assembly is completed by the inclusion of leveling screws mounted on the weighted base member.

The co-operating firearm level sub-assembly is comprised of an elongated rigid bar member having a flat undersurface and a bubble level mounted at the end of the rigid bar member away from the flat undersurface and oriented parallel to the longitudinal axis of that bar member. The level sub-assembly also includes an elastic band which functions to removably mount the sub-assembly upon a firearm with the sub-assembly flat undersurface contacting and being supported by an upper surface of the receiver area of the firearm.

From a method standpoint the invention involves the steps of positioning the firearm having a scope with a canted reticle system so that its vertical axis is positioned vertically as indicated by the level bubble of the mounted level sub-assembly, positioning the vertical reference shaft sub-assembly a distance from the muzzle end of the firearm, then rotating the scope on the firearm sufficiently to align the vertical cross hair of the scope reticle system with the distant vertical reference shaft sub-assembly, and lastly locking the sighting scope in the corrected position on the firearm.

BRIEF DESCRIPTION OF THE DRAWINGS

FIG. 3 is a schematic side elevation view of the sub-assemblies of FIGS. 1 and 2 as utilized with the receiver portion of a rifle-type firearm;

FIG. 6 is an elevation view of another embodiment of the invention apparatus vertical reference sub-assembly.

DETAILED DESCRIPTION

Figure 1:
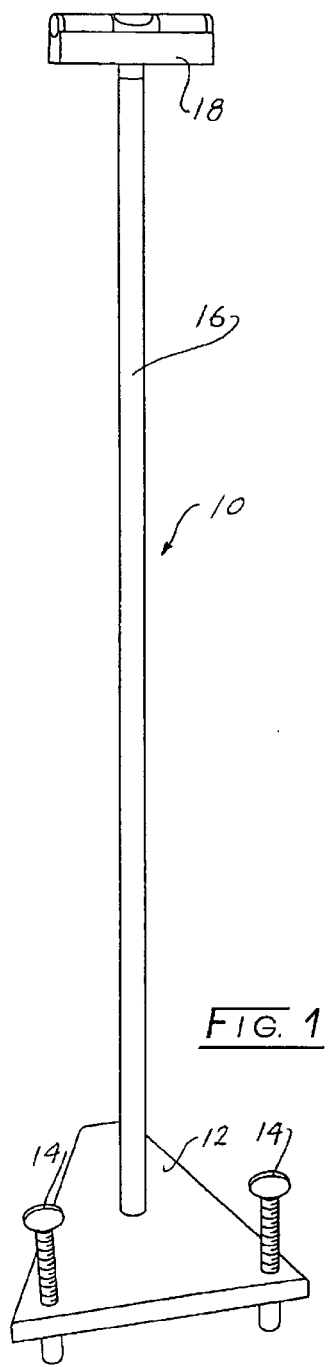
FIG. 1 is a perspective view of the invention apparatus vertical reference sub-assembly.

FIG. 1 illustrates a preferred embodiment of a vertical reference sub-assembly 10 which is comprised of a metallic and weighty base element 12, hand-turned threaded adjusting screws 14, a vertical reference shaft 16 projecting upwardly from base element 12, and a conventional bubble level assembly 18 secured to the upper extreme of vertical reference shaft 16 and oriented with its longitudinal axis perpendicular to the longitudinal axis of shaft 16. Adjusting screw 14 may be rotated until bubble level assembly 18 indicates a level condition thereby providing a true vertical alignment for shaft 16. It should be noted that throughout the disclosure which follows each firearm is assumed to have orthogonal axes intersecting the firearm center of gravity and comprised of a longitudinal axis which extends the length of the firearm, a vertical axis which is perpendicular to the longitudinal axis and essentially is an axis of symmetry, and a transverse axis which is at right angles to and intersects both the longitudinal axis and the vertical axis.

Figure 2:
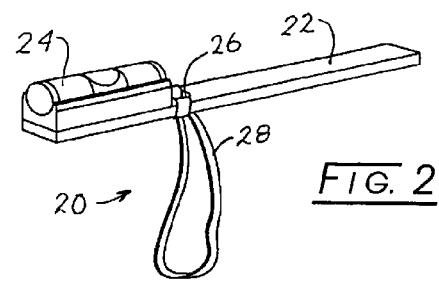
FIG. 2 is a perspective view of the invention apparatus firearm vertical axis tilt indicator sub-assembly.

FIG. 2 illustrates firearm level sub-assembly 20 which is comprised of an elongated metallic bar base 22, a conventional bubble level 24 mounted on bar base 22, and a bore 26 which is utilized for securing elastic band 28 to the sub-assembly. Sub-assembly 20 is joined to a flat portion of the receiver section of a firearm having canted cross hairs in its sighting scope reticle system using the elastic band in a wrap-around fashion as illustrated in FIG. 4.

Figure 5:
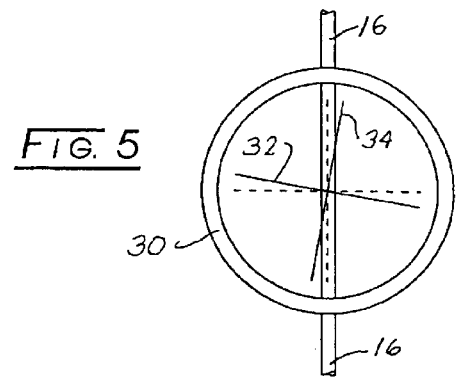
FIG. 5 illustrates the adjustment made to a gun scope reticle to correct for initial and unwanted vertical cross hair canting.

FIG. 3 schematically illustrates, in side elevation, a conventional sighting scope 30 having reticle system horizontal cross hair 32 and vertical cross hair 34 (see FIG. 5). Sighting scope 30 resides in scope rings 31 which are mounted upon and supported by a flat portion of the receiver section or area of firearm 40 which in FIG. 3 is representative of the receiver section of a conventional rifle firearm. Note the illustration of attached firearm level sub-assembly 20 which has its longitudinal axis oriented parallel to the transverse axis of receiver section 40. Because the upper surface of receiver section 40 is flat and oriented perpendicular to the vertical axis of receiver section 40, mounted sub-assembly 20 also has its longitudinal axis oriented at right angles to the vertical axis of receiver section 40.

Figure 4:
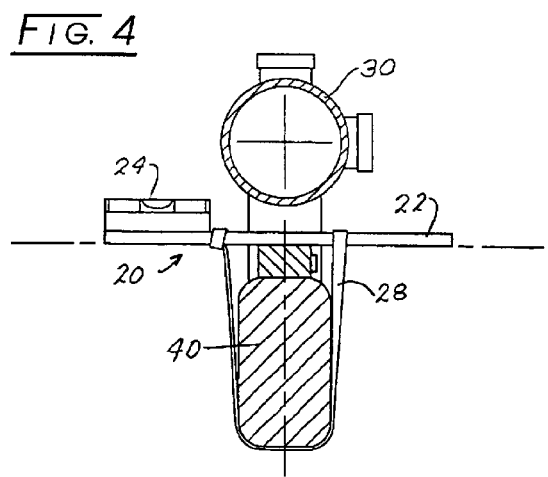
FIG. 4 is a section view taken at line 4—4 of FIG. 3.

FIG. 4 is a cross-section view taken at line 4—4 of FIG. 3 to better illustrate the mounted relationship of firearm level sub-assembly 20 to receiver section 40 when properly installed upon firearm receiver section 40. Note the removable wrap-around condition of elastic band 28.

FIG. 5 is an end view of sighting scope 30 showing cross hairs 32 and 34 in an initial canted condition relative to the vertical axis of the firearm (and relative to the vertical reference rod 16). Correction or compensation of the included cross hair canting is completed while bubble level 24 is in a level condition by the counterclockwise rotation of scope 30 until the vertical cross hair 34 and vertical reference shaft 16 are aligned and the sighting scope locked in position by securing scope rings 31.

FIG. 6 schematically illustrates an alternate vertical reference sub-assembly 50. This particular embodiment, which is satisfactory for use only in indoor or other environments wherein there is no air motion, is comprised of weighted base 52, leveling screws 54, U-shaped frame 56, and a weighted pendulum 58 which is supported by and drops from the top of frame 56. Pendulum 58 serves as the vertical reference necessary for use in effecting correction of the firearm reticle system for any included canting of cross hairs.

Various other changes may be made to the apparatus in size, proportions, and material of construction without departing from the meaning, scope, or intent of the claims which follow.

I claim as my invention:

1. A method of correcting the cant of vertical and horizontal cross hairs in the reticle system of a sighting scope attached to a firearm having a receiver section with a flat portion oriented perpendicular to the vertical axis of the receiver section, and comprising the steps of:

placing the firearm sighting scope in a condition whereby it may be rotated about its longitudinal axis;

mounting a horizontal level assembly on the flat portion of the receiver section transversely to its longitudinal axis;

rotating the firearm about its longitudinal axis until the horizontal level assembly indicates the firearm transverse axis is level thereby causing the firearm vertical axis of symmetry to be in a true vertical condition;

locating a vertical reference distant from but in alignment with the firearm sighting scope;

rotating the firearm sighting scope about its longitudinal axis until the vertical cross hair of the reticle system is in alignment with said vertical reference; and placing the firearm sighting scope in a condition whereby it may not be readily rotated about its longitudinal axis.

2. The method of claim 1 wherein said horizontal level assembly comprises a bubble level mounted on the flat portion of the firearm receiver transversely to the longitudinal axis of the firearm and wherein the vertical axis of symmetry of the firearm is positioned in a true vertical condition when said bubble level indicates a horizontally level position.

3. A method of correcting the cant of vertical and horizontal cross hairs in the reticle system of a sighting scope attached to a firearm, and comprising the steps of:

placing the firearm sighting scope in a condition whereby it may be rotated about its longitudinal axis;

rigidly positioning the firearm with its vertical axis of symmetry in a true vertical condition;

locating a vertical reference distant from but in alignment with the firearm sighting scope;

rotating the firearm sighting scope about its longitudinal axis until the vertical cross hair of the reticle system is in alignment with said vertical reference;

placing the firearm sighting scope in a condition whereby it may not be readily rotated about its longitudinal axis;

wherein a bubble level is mounted on a flat portion of the firearm receiver transversely to the longitudinal axis of the forearm and the vertical axis of symmetry of the firearm is positioned in a true vertical condition when said bubble level indicates a horizontally level position.

* * * * *